US010569371B2

(12) United States Patent
Wiethoff et al.

(10) Patent No.: US 10,569,371 B2
(45) Date of Patent: Feb. 25, 2020

(54) SEPARATION UNIT

(71) Applicant: WEBER SCHRAUBAUTOMATEN GmbH, Wolfratshausen (DE)

(72) Inventors: Ralf Wiethoff, Weilheim (DE); Jochen Hartmann, Bad Tölz (DE)

(73) Assignee: Weber Schraubautomaten GmbH (DE)

(*) Notice: Subject to any disclaimer, the term of this patent is extended or adjusted under 35 U.S.C. 154(b) by 0 days.

(21) Appl. No.: 15/861,630

(22) Filed: Jan. 3, 2018

(65) Prior Publication Data

US 2018/0193966 A1    Jul. 12, 2018

(30) Foreign Application Priority Data

Jan. 10, 2017    (DE) .................. 10 2017 100 385

(51) Int. Cl.
| | |
|---|---|
| *B23P 19/00* | (2006.01) |
| *B21J 5/06* | (2006.01) |
| *B23P 19/06* | (2006.01) |
| *B21K 25/00* | (2006.01) |

(52) U.S. Cl.
CPC ............. *B23P 19/002* (2013.01); *B21J 5/066* (2013.01); *B23P 19/003* (2013.01); *B23P 19/06* (2013.01); *B21K 25/005* (2013.01)

(58) Field of Classification Search
CPC ....... B23P 19/002; B23P 19/06; B23P 19/003; B21J 5/066; B21K 25/005
USPC .................................................. 221/171, 156
See application file for complete search history.

(56) References Cited

U.S. PATENT DOCUMENTS

| | | | | |
|---|---|---|---|---|
| 3,871,295 | A | * | 3/1975 | Ackley .................. B41F 17/36 101/40 |
| 4,427,131 | A | * | 1/1984 | Facchini ................ B65G 47/24 198/400 |
| 4,593,845 | A | * | 6/1986 | Andersson ............. B25B 23/06 227/112 |
| 4,721,230 | A | * | 1/1988 | McKnight .............. A61J 3/074 193/45 |
| 4,828,142 | A | * | 5/1989 | McKnight .............. A61J 3/074 221/171 |
| 5,291,645 | A | * | 3/1994 | Aoyama ............... B23P 19/006 29/240 |
| 6,357,109 | B1 | | 3/2002 | Shinjo |
| 6,990,897 | B2 | * | 1/2006 | Gaskin ................. B23P 19/006 100/214 |

(Continued)

FOREIGN PATENT DOCUMENTS

| | | |
|---|---|---|
| EP | 0644017 A1 | 9/1994 |
| JP | S4892676 U | 11/1973 |

(Continued)

OTHER PUBLICATIONS

Search Report from European Patent Office for related European Application No. 17206646.6, dated May 23, 2018; 9 pages.

*Primary Examiner* — Rakesh Kumar

(57) ABSTRACT

The invention relates to a separation unit for a feed apparatus for joining elements, in particular screws, in particular flow-drilling screws, comprising a joining element receiver for receiving a joining element having a head and a shaft, a slider displaceable relative to the joining element receiver, and a rotational element about which the joining element received in the joining element receiver is rotatable on a displacement of the slider.

18 Claims, 3 Drawing Sheets

(56) References Cited

U.S. PATENT DOCUMENTS

Figure 1:
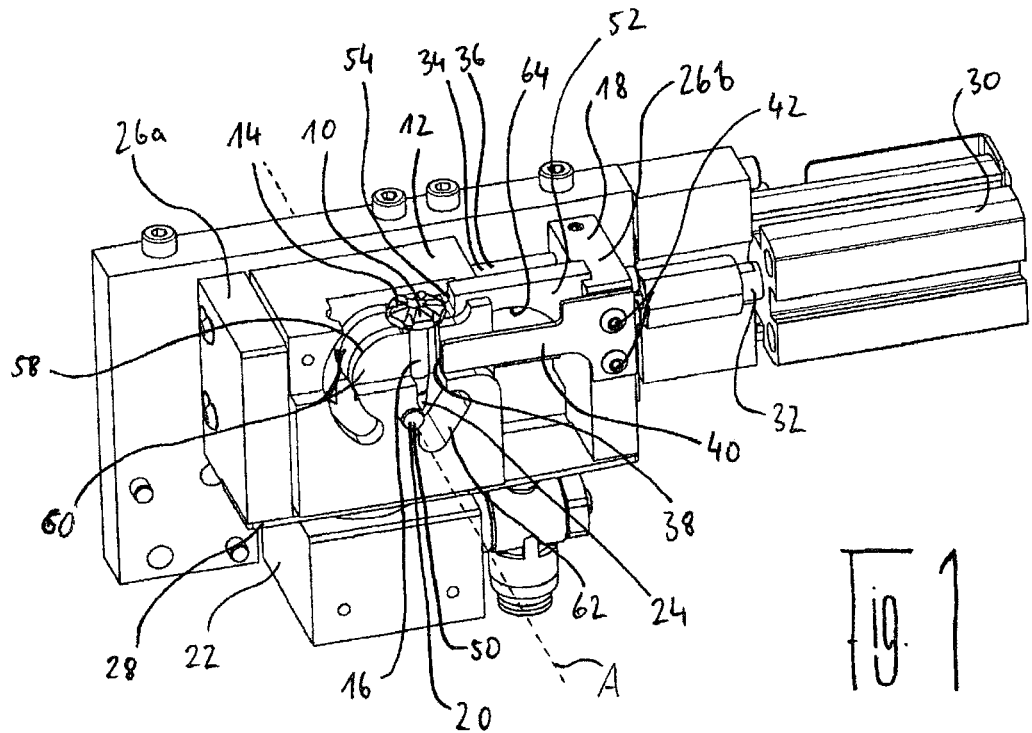

| | | | | |
|---|---|---|---|---|
| 7,367,484 B2* | 5/2008 | Neal | ................ | B21J 15/32 |
| | | | | 227/109 |
| 8,347,766 B2* | 1/2013 | Ota | ................ | B23P 19/003 |
| | | | | 81/430 |
| 8,703,054 B2* | 4/2014 | Yamagata | ........ | G01N 35/00029 |
| | | | | 422/63 |
| 9,421,649 B2* | 8/2016 | Chung | ................ | B23P 19/003 |
| 9,662,754 B2* | 5/2017 | Beaty | ................ | B23P 19/005 |
| 2003/0116038 A1 | 6/2003 | Gaskin et al. | | |
| 2011/0297724 A1* | 12/2011 | Shinjo | ................ | B23P 19/006 |
| | | | | 227/119 |

FOREIGN PATENT DOCUMENTS

| | | |
|---|---|---|
| JP | S6061411 A | 4/1985 |
| JP | H02105919 U | 4/1990 |
| JP | H02139133 A | 5/1990 |

\* cited by examiner

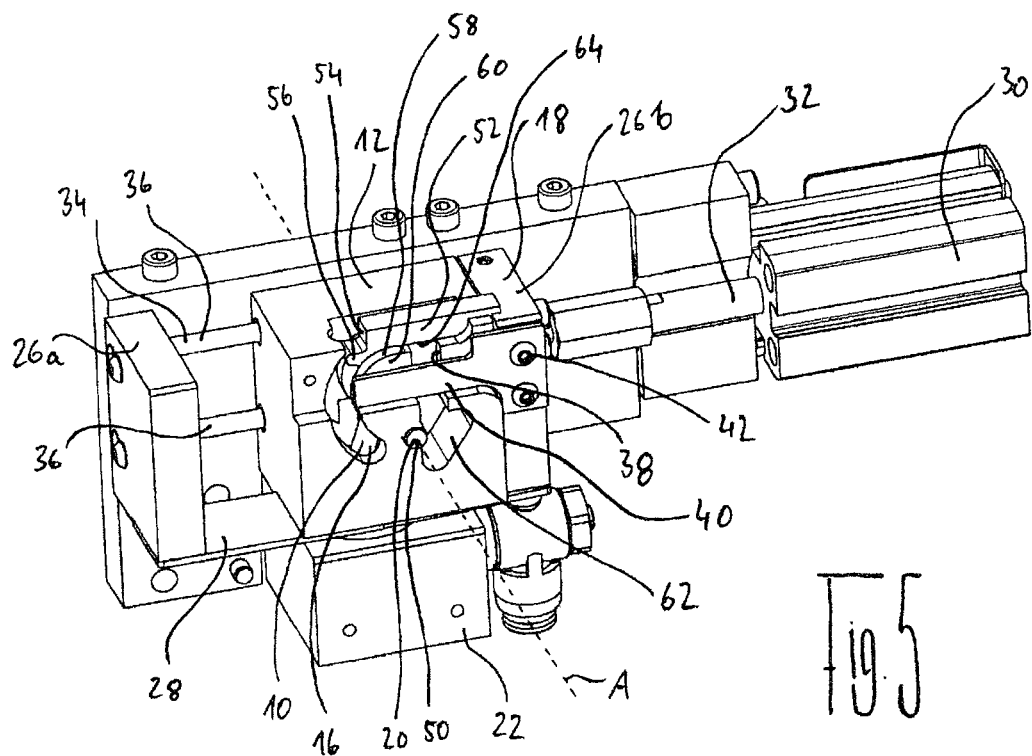

SEPARATION UNIT

The present invention relates to a separation unit for a feed apparatus for joining elements, in particular screws, in particular flow-drilling screws.

In joining systems, separation units serve, for example, to separate joining elements that are stored in a magazine and that can then be fed to a joining apparatus such as a screwing apparatus by means of a feed apparatus. The joining means is there brought into contact with a component to be joined with the aid of the joining apparatus and is set into rotation such that a flow-drilled hole is formed due to the friction heat created in this process and due to the advance of the joining means. It is important in this context that the joining means is harder or firmer than the component to be joined, with it proving to be particularly favorable for the joining element, in particular a tip of the joining element facing the component to be joined, to be coated, e.g. to have a high-strength coating. High-strength coatings are typically brittle, which can have the result that the coating detaches from the joining element under the effect of force, in particular an abrupt effect of force, on the joining element, e.g. due to an unwanted collision with a hard object. This is a problem to the extent that a detachment of the coating, in particular in the region of the tip of the joining element, can have the consequence that the performance of the joining element is reduced or that the joining element becomes completely unusable, whereby ultimately the joining process and the quality of the resulting joining point is also impaired.

To protect a coated tip of a joining element during the feed to the joining apparatus, it is known to pneumatically rotate the joining element prior to the feed to the joining apparatus and to feed it to the joining apparatus head first.

Known pneumatic rotational apparatus are, however, complex in construction, are cost-intensive and can be prone to disturbance.

It is an object of the invention to provide an alternative to the pneumatic rotational apparatus that overcomes their disadvantages.

A separation unit having the features of claim 1 is provided to satisfy the object.

The separation unit in accordance with the invention for a feed apparatus for joining elements, in particular screws, in particular flow-drilling screws, comprises a joining element receiver for receiving a joining element having a head and a shaft, a slider displaceable relative to the joining element receiver and a rotational element about which the joining element received in the joining element receiver is rotatable on a displacement of the slider.

It is the general idea underlying the invention not to rotate a joining element pneumatically, but rather mechanically, and indeed by means of a separation unit anyway present. The separation unit in this respect satisfies a dual function in that is serves both for the isolation of the joining elements to be fed to a joining apparatus and for their rotation. The advantage results from this that the rotation of the individual joining elements can be realized in a simpler and less expensive manner overall.

A mechanical rotation of the joining element with the aid of the slider is also present in this respect when the slider is fluidically actuated, for example hydraulically or, particularly preferably, pneumatically. It is generally also conceivable to displace the slider with the aid of an electric motor. The rotation of the joining element per se ultimately takes place in every case purely mechanically, however.

The separation unit in accordance with the invention advantageously has the same outer dimensions as a conventional separation unit without a rotation possibility such that a conventional separation unit of an existing joining system can easily be replaced with a separation unit in accordance with the invention. This is further promoted in that the same signals can be used for controlling the separation unit in accordance with the invention as for a conventional separation unit.

The joining element receiver is preferably attached in a fixed position and the slider is displaceable relative to the joining element receiver. In principle, however, it is also conceivable that the slider is conversely attached in a fixed position and the joining element receiver is movable with respect to the slider. Both components, i.e. both the joining element receiver and the slider, can moreover be movable relative to one another.

The joining elements can be screws, in particular metal screws, elements that are processed in direct drilling processes or flow drilling processes, or also thread-free setting elements that are processed in friction welding processes and can comprise a metal material or also a plastic material.

The feed apparatus can be a tube or a hose that connects the separation unit to the joining apparatus and enables the feed of an isolated and rotated joining element thereto.

Advantageous embodiments of the invention can be seen from the dependent claims, from the description and from the drawings.

The slider can preferably be displaced between a receiving position and an output position, with the joining element being receivable in a first alignment in the receiving position of the slider and being aligned in a second alignment rotated with respect to the first alignment in the output position of the slider.

The rotational element can define an axis of rotation about which the joining element received in the joining element receiver can be rotated. In this respect, the axis of rotation is preferably aligned at least approximately perpendicular to a longitudinal center axis of the joining element received in the joining element receiver so that a rotation of the joining element received in the joint element receiver takes place at least approximately perpendicular to the axis of rotation of the rotational element. It is, however, also conceivable that the joining element received in the joining element receiver can also be rotated about the axis of rotation of the rotational element at another angle differing from a perpendicular angle, that is so-to-say transversely to the axis of rotation.

In accordance with an advantageous embodiment, the rotational element is formed by a rotating pin, in particular a cylindrical rotating pin, that is aligned at least approximately perpendicular to a longitudinal center axis of the joining element received in the joining element receiver. It is, however, also conceivable that the rotational element can have any other desired form such as a spherical form or an arbitrary prismatic form.

It is particularly advantageous for the joining element receiver to have a guide for the joining element received by the joining element receiver to guide the joining element during its rotation. In this respect, the guide can be formed as a guide track along which the head of the joining element, in particular a lower side of the head facing the shaft of the joining element, runs during the rotation of the joining element. The guide pin can extend at least partly in circular form about the rotational element.

A particularly favorable guidance of the joining element during its rotation can be achieved if the guide track is formed by two guide walls that are aligned at least approximately in parallel with one another and that receive the shaft of a joining element received in the joining element receiver between them.

A prolongation extending at least approximately in parallel with a direction of displacement of the slider can be formed at the slider for a better rotation of the joining element received in the joining element receiver and can be brought into engagement with the joining element, in particular with the head of the joining element, on a displacement of the slider from the receiving position into the output position.

So that a tip formed at the shaft and disposed opposite the head of the joining element does not contact either the joining element receiver or the prolongation on a rotation of the joining element received in the joining element receiver, cut-outs for the joining elements in which the tip can dip on a rotation of the joining element can be provided both at the joining element receiver and at the prolongation. The joining element receiver can in this respect have a cut-out for the joining element at a side of the rotational element disposed opposite the guide track, whereas the prolongation can have a cut-out for the joining element at a lower side facing the rotational element.

To prevent a further joining element from moving into the joint element receiver during a rotation of a joining element received in the joint element receiver, a latch can be formed at the slider that blocks an inlet opening for the entry of a further joining element during a movement of the slider into its output position. The latch advantageously extends at least approximately in parallel with a direction of movement of the slider.

To output a rotated joining element, the joining element receiver can have an output opening through which the joining element received by the joining element receiver can be output in the output position of the slider.

A secure guidance of the slider during its displacement relative to the joining element receiver can advantageously be achieved in that the slider is displaceably supported at the joining element receiver by means of a guide device.

Figure 2:
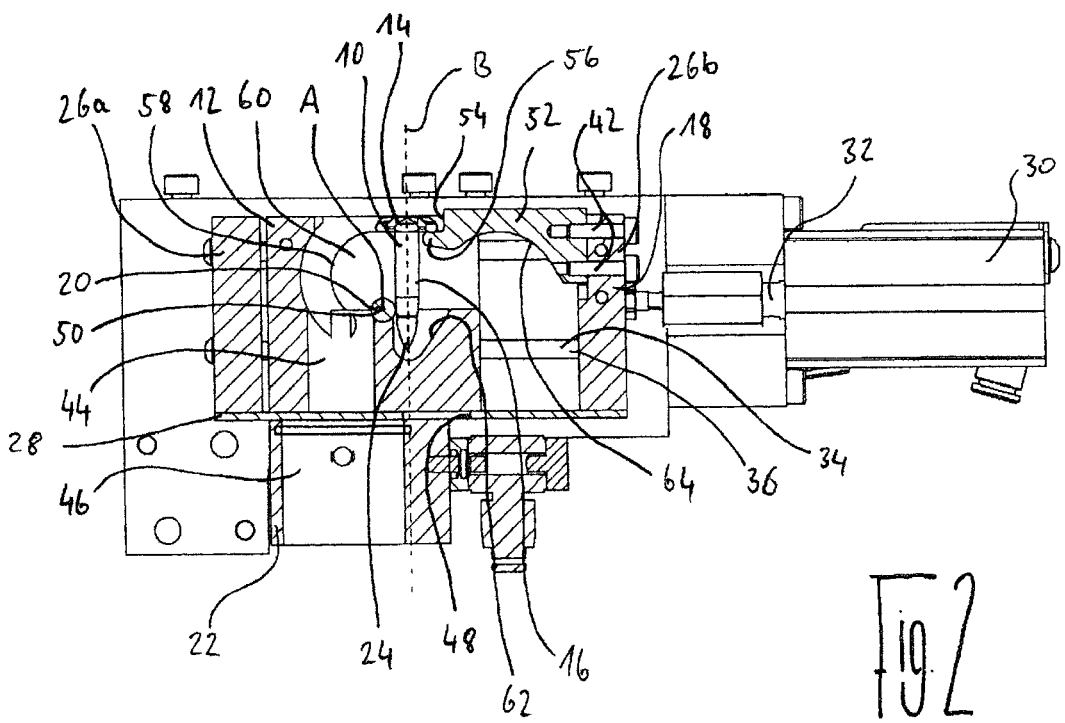
Figure 3:
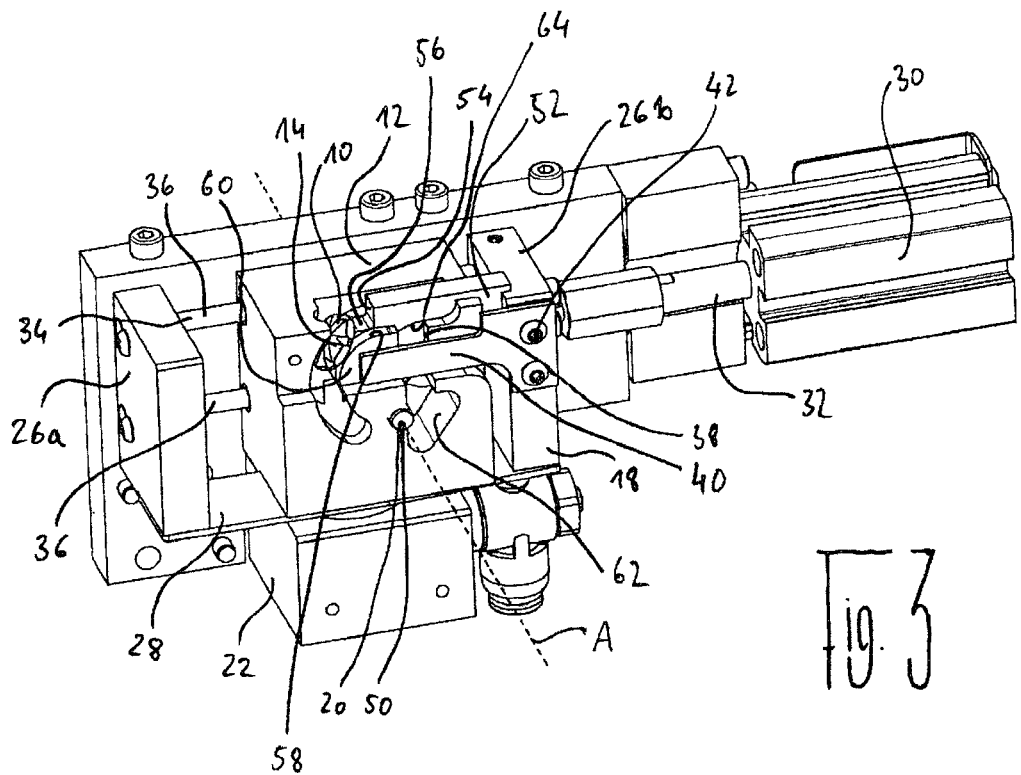
Figure 4:
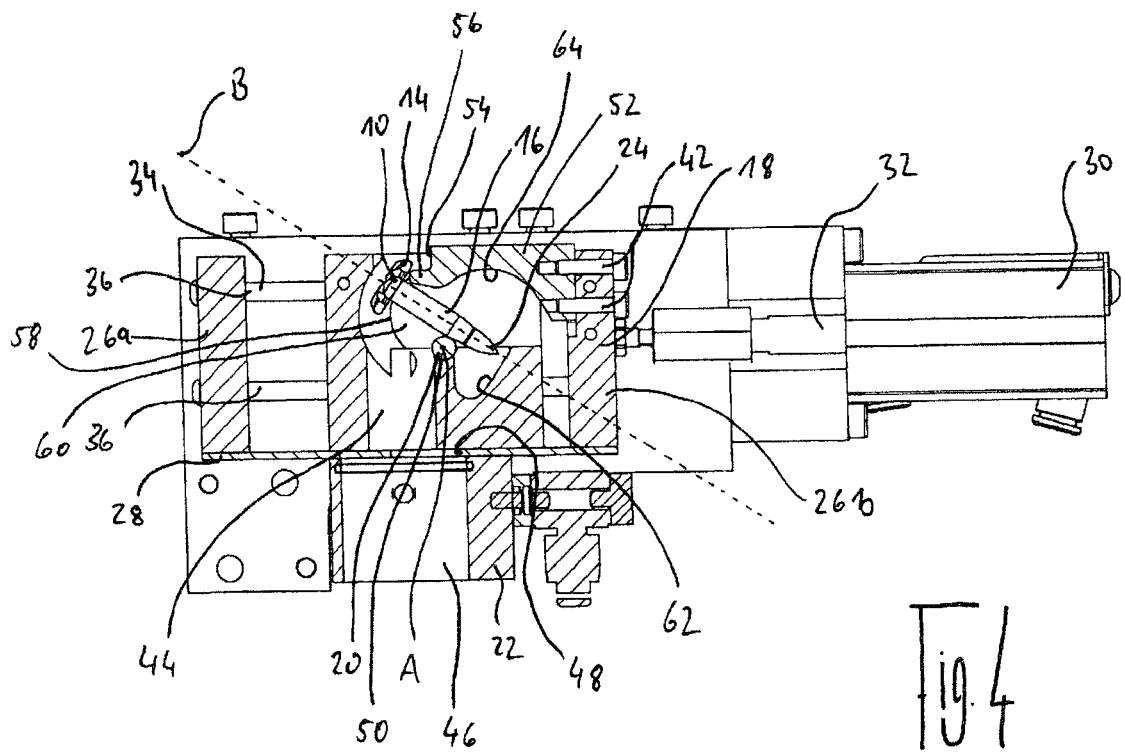

The invention will be described in the following purely by way of example with reference to a possible embodiment and to the enclosed drawings. There are shown:

FIG. 1 a perspective view of a separation unit in accordance with the invention with a slider located in a receiving position;

FIG. 2 a longitudinal sectional view of the representation of FIG. 1;

FIG. 3 a perspective view of the separation unit of FIG. 1, with the slider being in an intermediate position;

FIG. 4 a longitudinal sectional view of the representation of FIG. 3;

FIG. 5 a perspective view of the separation unit of FIG. 1, with the slider being in an output position; and FIG. 6 a longitudinal sectional view of the representation of FIG. 5.

The Figures show a separation unit of a feed apparatus for joining elements 10 that each have a head 14 and a shaft 16. The joining elements 10 are preferably screws, in particular flow-drilling screws, that can comprise a metal material or also a plastic material and that in particular have a high-strength coating in the region of their tips 24.

The separation unit comprises a joining element receiver 12 for receiving a joining element 10, a slider 18 displaceable relative to the joining element receiver 12, and a rotational element 20 about which the joining element 10 received in the joining element receiver 12 is rotatable on a displacement of the slider 18. The separation unit moreover has a connector element 22 to which a hose not shown in the Figures can be connected by means of which the joining element 10 output by the separation unit can be fed to a joining apparatus.

The slider 18 is displaceable between a receiving position (FIGS. 1 and 2) and an output position (FIGS. 5 and 6), with FIGS. 3 and 4 showing purely by way of example an intermediate position of the slider 18 between its receiving position and its output position. A movement sequence is therefore shown from FIG. 1 via FIG. 3 to FIG. 5 (or from FIG. 2 via FIG. 4 to FIG. 6) while the slider 18 is displaced from right to left out of its receiving position into its output position.

The receiving position and the output position of the slider 18 are defined by two abutments 26a, 26b that are aligned in parallel with one another, that extend perpendicular to the displacement direction of the slider 18 and that are connected via a common base plate 28 extending between the joining element receiver 12 and the connector element 22. It is understood that the slider 18 can, however, generally also be formed without a base plate.

A pneumatically actuated drive 30, e.g. a pneumatic cylinder, can be provided to displace the slider 18 that displaces the slider 18 by means of a piston 32 between the receiving position and the output position. The slider 18 is moreover displaceably supported at the joining element receiver 12 by means of a guide device 34 that, as can in particular be recognized with reference to FIGS. 2 to 6, is formed by two guide bars 36 that are aligned in parallel with one another and that extend in the direction of displacement of the slider 18.

The joining element receiver 12 has an inlet opening 38 through which a joining element 10 enters into the joint element receiver 12. To prevent the entry of a further joining element 10 during a rotational process of a joining element 10 already received in the joining element receiver 12, a latch 40 is formed at the slider 18 that extends in parallel with the direction of displacement of the slider 18 and that blocks the inlet opening 38 on a displacement of the slider 18 from its receiving position into the output position (FIGS. 3 and 5). In the embodiment shown, the latch 40 is attached to the abutment 26b defining the output position of the slider 18 by means of a fastening means, two screws 42 here. It is understood that the latch 40 can also be fastened to the slider 18 in a different manner, for example with material continuity by means of an adhesive. It is moreover conceivable that the latch 40 can be formed in one piece with the slider 18.

The joining element receiver 12 furthermore has an output opening 44 that serves to output rotated joining elements 10. The output opening 44 opens into a receiver opening 46 of the connector element 22. As can be recognized with reference to FIG. 6, an opening 48 of the slider 18 provided in the base plate 28 is aligned with the outlet opening 44 in the output position of the slider 18 and can thus release a rotated joining element 10.

As already mentioned, the rotation of the joining element 10 takes place about a rotational element 20 that is here formed in the shape of a rotating pin 50. The rotational element 20 defines an axis of rotation A about which a joining element 10 received in the joining element receiver 12 is rotatable and which is aligned at least approximately perpendicular to a longitudinal center axis B (FIGS. 2, 4, and 6) of the joining element 10 received in the joining element receiver 12. In other words, the rotating pin 50 is aligned at least approximately perpendicular to the longitudinal center axis B of the joining element 10 received in the joining element receiver 12.

A prolongation 52 is furthermore provided at the slider 18 that extends at least approximately in parallel with the direction of displacement and that can be brought into engagement with the head 14 of the joining element 10. In the present embodiment, the prolongation 52 is attached, by means of two screws 42 here, to the abutment 26b defining the output position of the slider 18. It is understood that the prolongation 52 can, however, also be connected to the slider 18 with material continuity or can be formed in one piece with the slider 18. The prolongation 52 has an end face 54 which faces the joining element 10 received in the joining element receiver 12, i.e. non-rotated, and from which a collar 56 projects that extends in the direction of the direction of displacement of the slider 18.

In the receiving position, the collar 56 is aligned flush with a guide formed as a guide track 58 (FIG. 2) that serves to guide the joining element 10 received in the joint element receiver 12 during its rotation. The guide track 58 extends at least partly in circular form about the axis of rotation A of the rotational element 20 and furthermore has two guide walls 60 which are aligned in parallel with one another, which receive the shaft 16 of a joining element 10 received in the joining element receiver 12 between them and between which the prolongation 52 is movable on a displacement of the slider 18.

So that the coated tip 24 of the joining element 10 still does not come into contact either with the joining element receiver 12 or with the prolongation 52 during its rotation, both the joining element receiver 12 and the prolongation 52 each have a cut-out 62, 64.

The cut-out 62 of the joining element receiver 12 extends, starting from the rotational element 20, downward in the direction of the base plate 28 of the slider 18 or of the connector element 22 and has a V shape viewed in the longitudinal section of the separation unit (FIGS. 2, 4, and 6). The prolongation 52 in contrast has an arcuate cut-out 64 at its lower side facing the rotational element 20. It is conceivable that the respective cut-outs 62, 64 can also have a differently designed shape as long as the tip 24 of the joining element 10 does not contact the joining element receiver 12 or the prolongation 52 during a rotation of the joining element 10.

In the following, a rotation of a joint element 10 received in the joining element receiver 12 will be explained with reference to the movement sequence shown in the Figures.

In the received position of the slider 18 shown in FIGS. 1 and 2, a joining element 10 is received in a vertical first alignment by the joining element receiver 12, with the head 14 of the joining element 10 being held at its lower side facing the shaft 16 by the guide track 58 and, on the other hand, by the collar 56 such that the tip 24 of the shaft 16 dips contactlessly into the cut-out 62 of the joining element receiver 12. The shaft 16 of the joining element 10 moves into engagement with the rotating pin 50 by a subsequent displacement of the slider 18 in the direction of its output position and the joining element 10 is rotated about the rotational element 20 while the lower side of the head 14 runs up on the guide track 58 (FIGS. 3 and 4). Once the slider 18 has arrived at its output position (FIGS. 5 and 6), the joining element 10 is rotated with respect to its first alignment into a second alignment oblique thereto and the joining element 10 falls upside down due to gravity into the connector element 22 from where it can be fed to the joining device via the hose, not shown. It is understood that the joining element 10 cannot only be moved from the joining element receiver 12 due to gravity, but also, for example, by means of compressed air.

The rotated joining element 10 moves via the hose with the head 14 at the front to the joining apparatus where it is again rotated by a rotational device (not shown) connected upstream of the joining apparatus in an alignment in which the tip 24 faces forward. In the meantime, the slider 18 is again pushed back into its receiving position so that a following joining element 10 can be received and rotated in the joining element receiver 12 of the separation unit.

REFERENCE NUMERAL LIST 10 joining element
12 joining element receiver
14 head
16 shaft
18 slider
20 rotational element
22 connector element
24 tip
26 abutment
28 base plate
30 drive
32 piston
34 guide device
36 guide bar
38 inlet opening
40 latch
42 screw
44 output opening
46 receiver opening
48 opening
50 rotating pin
52 prolongation
54 end face
56 collar
58 guide track
60 guide wall
62 cut-out
64 cut-out
A axis of rotation
B longitudinal center axis

The invention claimed is:

1. A separation unit for a feed apparatus for joining elements, the separation unit comprising:
   a joining element receiver for receiving a joining element, the joining element having a head and a shaft, the joining element receiver attached in a fixed position;
   a slider displaceable relative to the joining element receiver; and
   a rotational element about which the joining element received in the joining element receiver is rotatable on a displacement of the slider upon contact of the joining element with the rotational element, the rotational element being attached in a fixed position with respect to the joining element receiver and defining an axis of rotation, the rotational element extending in a direction of the axis of rotation.

2. The separation unit in accordance with claim 1, wherein the joining elements are screws.

3. The separation unit in accordance with claim 2, wherein the screws are flow-drilling screws.

4. The separation unit in accordance with claim 1, wherein the slider is displaceable between a receiving position and an output position, with the joining element being receivable by the joining element receiver in a first alignment in the receiving position of the slider and being aligned in a second alignment rotated with respect to the first alignment in the output position of the slider.

5. The separation unit in accordance with claim 1, wherein the axis of rotation is aligned at least approximately perpendicular to a longitudinal center axis of the joining element received in the joining element receiver.

6. The separation unit in accordance with claim 1, wherein the rotational element is formed by a rotating pin that is aligned at least approximately perpendicular to a longitudinal center axis of the joining element received in the joining element receiver.

7. The separation unit in accordance with claim 1, wherein the joining element receiver has a guide for the joining element received by the joining element receiver that serves to guide the joining element during its rotation.

8. The separation unit in accordance with claim 7, wherein the guide forms a guide track along which the head of the joining element runs during the rotation of the joining element.

9. The separation unit in accordance with claim 8, wherein the guide track extends at least partly in circular form about the rotational element.

10. The separation unit in accordance with claim 8, wherein the guide track is formed by two guide walls that are aligned at least approximately in parallel with one another and that receive the shaft of a joining element received in the joining element receiver between them.

11. The separation unit in accordance with claim 8, wherein the joining element receiver has a cut-out for the joining element at a side of the rotational element disposed opposite the guide track.

12. The separation unit in accordance with claim 4, wherein a prolongation that extends at least approximately in parallel with a direction of displacement of the slider is formed at the slider and can be brought into engagement with the joining element on a displacement of the slider from the receiving position into the output position.

13. The separation unit in accordance with claim 12, wherein the prolongation has a cut-out for the joining element at a lower side facing the rotational element.

14. The separation unit in accordance with claim 4, wherein a latch is formed at the slider and blocks an inlet opening of the joining element receiver for the entry of a further joining element during a movement of the slider into its output position.

15. The separation unit in accordance with claim 14, wherein the latch extends at least approximately in parallel with a direction of movement of the slider.

16. The separation unit in accordance with claim 4, wherein the joining element receiver has an output opening through which the joining element received by the joining element receiver can be output in the output position of the slider.

17. The separation unit in accordance with claim 1, wherein the slider is displaceably supported at the joining element receiver by means of a guide device.

18. A separation unit for a feed apparatus for joining elements, the separation unit comprising:
a joining element receiver for receiving a joining element, the joining element having a head and a shaft;
a slider displaceable relative to the joining element receiver; and
a rotational element about which the joining element received in the joining element receiver is rotatable on a displacement of the slider upon contact between the joining element and the rotational element, the rotational element formed as a pin and the slider configured to move the shaft of the joining element into engagement with the pin on displacement of the slider, thereby rotating the joining element about the pin, the rotational element being attached in a fixed position with respect to the joining element receiver and defining an axis of rotation, the rotational element extending in a direction of the axis of rotation.

* * * * *